(12) United States Patent
Aoki

(10) Patent No.: US 7,057,769 B2
(45) Date of Patent: Jun. 6, 2006

(54) METHOD FOR CALIBRATING COLOR OF TRANSMITTED DIGITAL IMAGE

(75) Inventor: Akira Aoki, Kawasaki (JP)

(73) Assignee: Photographic Art Research Laboratory, Tokyo (JP)

( * ) Notice: Subject to any disclaimer, the term of this patent is extended or adjusted under 35 U.S.C. 154(b) by 525 days.

(21) Appl. No.: 10/034,303

(22) Filed: Dec. 28, 2001

(65) Prior Publication Data

US 2002/0085221 A1    Jul. 4, 2002

(30) Foreign Application Priority Data

Dec. 28, 2000    (JP)    ............... 2000-402621

(51) Int. Cl.
*G06F 15/00* (2006.01)
*G06K 1/00* (2006.01)

(52) U.S. Cl. .............. 358/1.9; 358/405; 358/2.1; 382/209; 382/214

(58) Field of Classification Search ............. 358/1.9, 358/405, 2.1; 382/209, 214
See application file for complete search history.

(56) References Cited

U.S. PATENT DOCUMENTS 5,499,040 A    3/1996    McLaughlin et al.
5,537,516 A    7/1996    Sherman et al.
5,579,031 A    11/1996    Liang

FOREIGN PATENT DOCUMENTS

| EP | 91301860.2 | 9/1991 |
|----|----|----|
| EP | 1130897 A2 | 9/2001 |
| JP | 11-338443 A | 12/1999 |

OTHER PUBLICATIONS

Dec. 14, 2004 European Search Report for 01310911.1-1241-.

*Primary Examiner*—Kimberly Williams
*Assistant Examiner*—Michael Burleson
(74) *Attorney, Agent, or Firm*—Kenyon & Kenyon LLP

(57) ABSTRACT

In the color image transmission system between a pair of computer image processing systems A & B, a common basic color such as R.G.B. basic color is firstly decided, then this common basic color is transmitted from the system A to the system B so that a digital image (X) is indicated on the monitor of the system B, the color matching operation is applied to the digital image (X) to substantially match the displayed color thereof and decide a correction value a from color data indicated on the monitor of the system B. This correction value α is used in a color calibration process applied to a digital image (Y) indicated on the monitor of the system B which is created by transmitting an original color image ($Y_0$) from the system A so that a color modified digital image (Z) having a color substantially matched to the color of the original color image ($Y_0$) is indicated on the monitor of the system B.

8 Claims, 7 Drawing Sheets

(A)

(B)

METHOD FOR CALIBRATING COLOR OF TRANSMITTED DIGITAL IMAGE

BACKGROUND OF THE INVENTION

The present invention relates to a method for calibrating color of a digital image transmitted from a computer image processing system to another computer image processing system so that color matching problems created by the transmission of digital images can be practically eliminated.

According to the recent developments in computer image processing technology and the communication technology for digital data, it has become possible to transmit digital images from one computer image processing system to another computer image processing system.

Advances in computer image processing technology and advances in digital data communications technology have made it possible to transmit digital images from one location to another in a short time regardless of distance. In particular, the recent advances in Internet communications technology have made rational management of the sending and receipt of digital images possible. These activities are having an effect even on our daily lives. For example, systems are appearing in which specific businesses provide information including digital images to large numbers of nonspecific consumers through an Internet communications system so as to engage in direct commercial transactions without going through intermediaries, or in which large numbers of nonspecific consumers order work of the same content to specific businesses through an Internet communications system as opposed to a conventional system, or ordering photographic processing to specific businesses through local photo processing shops. Further, cases have appeared in which photo processing shops having insufficient facilities or capabilities for computer image processing streamline their operations by business tie-ups through network systems involving known digital data transmission methods with businesses having sophisticated capabilities in that technology.

However, such systems for the transmission and reception of digital images have only just been put together. There are still problems remaining to be solved. One of these problems is the problem of the mismatch of color of an image transmitted between two computer image processing systems (brightness, contrast, chroma, and color balance: hereinafter simply referred to as "color").

In general, there is a method of reading an image by a scanner so as to store the image as digital data in a computer, or taking a photograph by a digital camera, then connecting the digital camera to a computer and transmitting and storing the digital data of the image in the computer. Whatever the case, a mismatch in color unavoidably occurs between the color of the original image and the color of the digital image displayed on the monitor of the computer. The reason is naturally due to the performance of the reading equipment and computers as explained later While the extent of the mismatch in image color due to these unavoidable factors differs depending on the equipment comprising the systems, the situation becomes more complicated the greater the number of the possible combinations of two image processing systems. It may be said without exaggeration that this problem has to be solved or else no further advances in digital information transmission systems including the transmission of images can be expected.

SUMMARY OF THE INVENTION

The present invention has as its object the provision of a rational and practical method for calibrating image color which solves the problems of the mismatch in image color, when using a pair of computer image processing systems or a plurality of computer processing systems in combination, or when transmitting an image between two computer image processing systems through a system For transmitting digital images using a communication system such as an Internet communication system.

To attain the above-mentioned object, the present invention was developed based on confirmation by experiments that the mismatch in image color occurring when transmitting an image between independent computer image processing systems A and B is due to the difference in the color related functions of the equipment making up the systems such as the difference in the reading function of image reading equipment and that this mismatch in color does not substantially change in content of the mismatch of image color even if the images dealt with differ.

The basic technical idea of the present invention was created based upon the knowledge mentioned above, as follows.

Acknowledging that there is no change in the function affecting the color of a transmitted image displayed on a monitor of a system B to which a digital image is transmitted from a system A, the basic color image, such as an R.G.B. standard color image, is scanned in the system A so that the digital data of this image is stored in the memory of the computer of the system A, the digital data of this basic R.G.B color image is then transmitted to the system B by way of a known transmission method, such as by using an MO (magneto-optical) disc, then a conventional color matching operation is applied to the digital R.G.B. image indicated on the monitor of the system B so as to match the color of this digital image to the color of original R.G.B. image in such a way that the color data is adjusted in, e.g. a floating palette to substantially match the color of the digital R.G.B. image to the color of the original R.G.B. image by operating the computer of the system B, so that the deviation of data from a zero point of the color data is read, next the deviated data is set as a correction value applied by the color matching operation to the digital image indicated on the monitor of the system B so as to create the condition that the color of any digital image indicated on the monitor of the system B can be accepted as being substantially identical to a corresponding original color image transmitted from the system A to the system B.

The above-mentioned basic technical idea of the present invention can be applied to creating a condition such that the color of the digital image indicated on the monitor of the system B is substantially matched to the color of the digital image indicated on the monitor of the system A.

Further, it is possible to select a common unique color image between two systems as a basic color image to set the correction data applied to the color matching operation mentioned above.

DESCRIPTION OF THE PREFERRED EMBODIMENTS

It is a known fact that information transmission systems linking pairs of computer image processing systems A and B through communications lines have been perfected and that digital data is accurately transmitted in that case. Further, it is known that similar results are obtained even when transmitting digital data between two systems through the use of MO discs. Therefore, for convenience in explanation, the present invention will be explained with reference to the following embodiments for the case of transmission of an image by use of an MO disc.

Before explaining the embodiments of the present invention in detail, the computer image processing systems A and B used in the experiments will be briefly explained. That is, in the experiments performed for confirming the embodiments of the present invention, a pair of independent computer image processing systems owned by the applicant of the present invention were used. The monitors in particular were arranged close to each other so as to confirm the results of the experiments.

Figure 1:
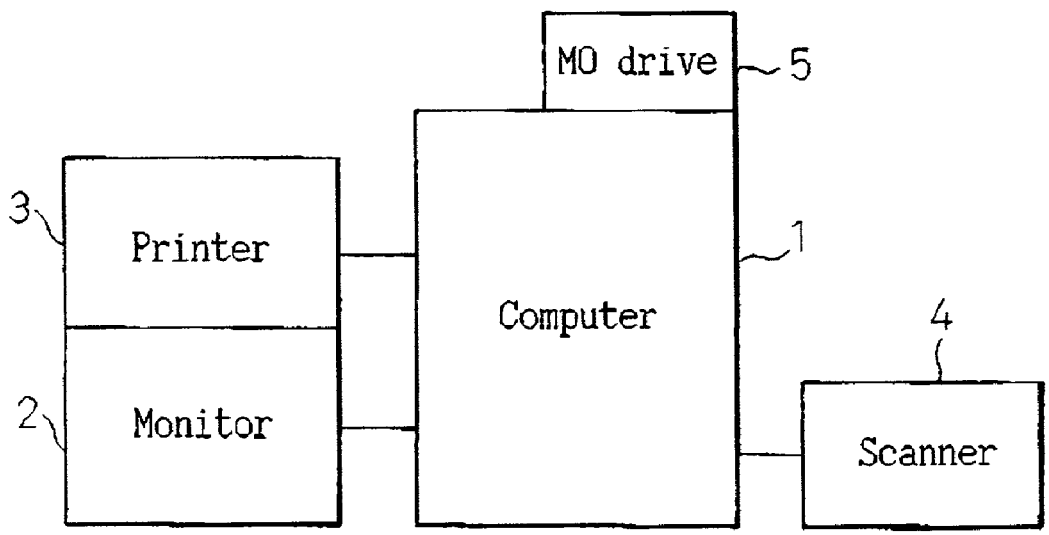
FIG. 1 is an explanatory view showing an outline of equipment of computer image processing systems A and B in a representative embodiment of the basic invention.
Figure 1:
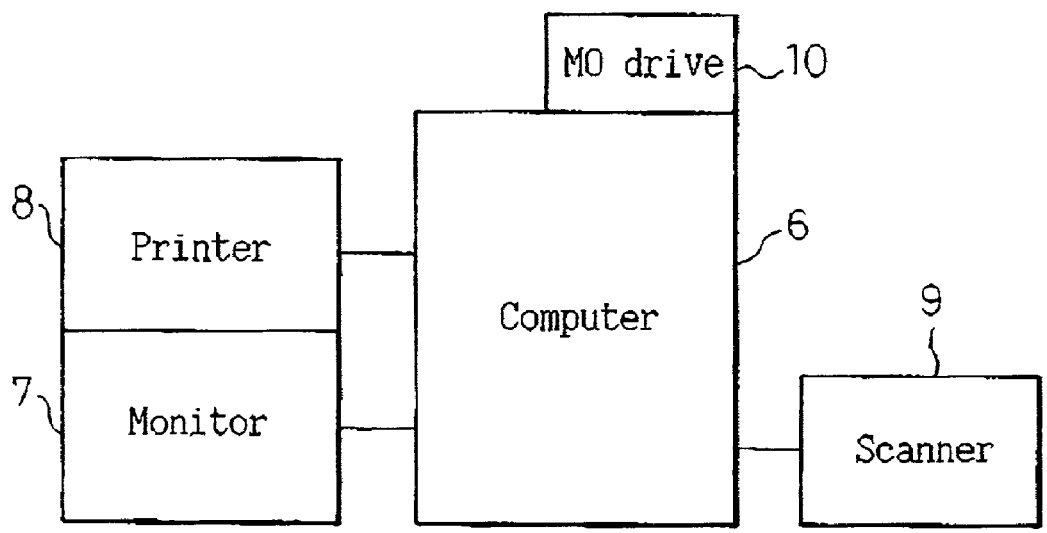

Next, these experimental facilities will be explained with reference to FIG. 1. As shown in FIG. 1, predetermined experiments were conducted using as the system A a system comprised of a Power Macintosh® G3 as the computer 1, a Sanyo® Electric Diamond RD 21G as the monitor 2, an Epson® PM-2000C Inkjet Printer as the printer 3, a Microtek® ScanMaker® 5 as the scanner 4, and an Olympus® Turbo MO 640S as the MO drive 5, and using as the system B a system comprised of a Power Macintosh® 9600/300 as the computer 6, a Sony® Trinitron® GPD-G 500J as the monitor 7, an Epson® PM-2000C Inkjet Printer as the printer 8, a Microtek® ScanMaker® 4 as the scanner 9, and an Olympus® 640 MO TURBO WHITE as the MO drive 10.

First Embodiment

Figure 2:
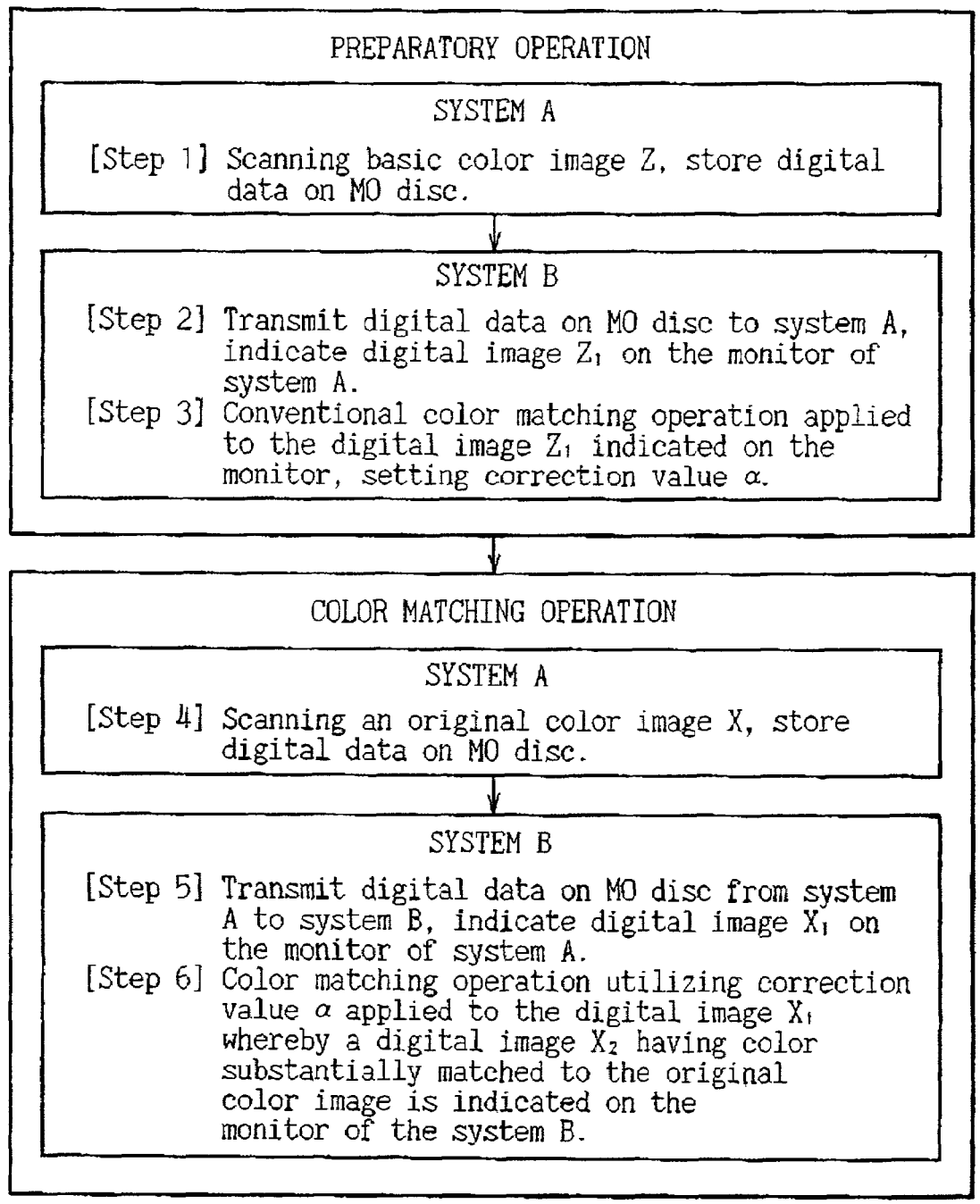
FIG. 2 is a flow chart of the content of an experiment of a first embodiment worked by transmitting an image from the computer image processing systems A to the computer image processing system B shown in FIG. 1.

This embodiment is a typical example of the present invention assuming the case of transmitting an original image from the system A to the system B through an MO disc, making the color of the digital image displayed on the monitor of the system B substantially match the color of the original image when viewed. Next, an explanation will be given of the results of an experiment conducted for confirming the results of this embodiment with reference to the flow chart shown in FIG. 2.

Figure 3:
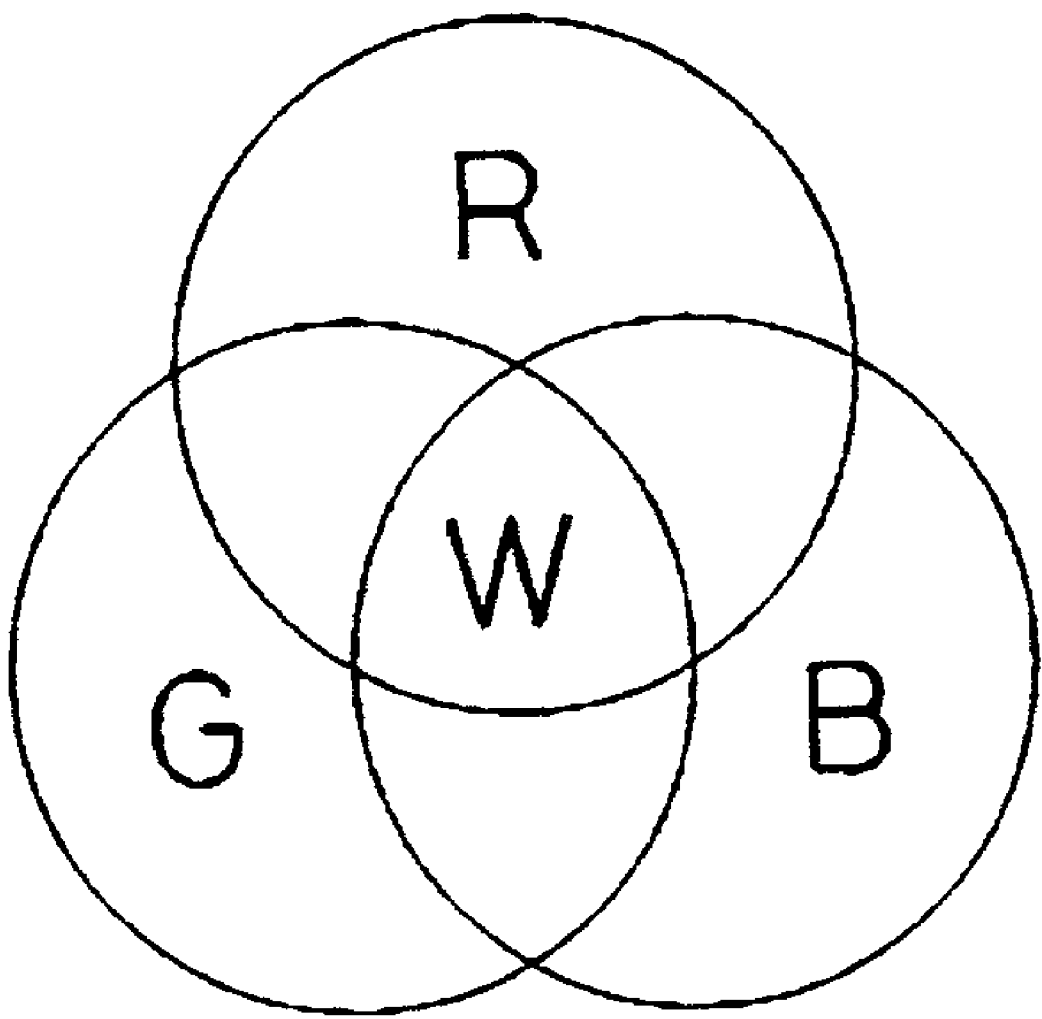
FIG. 3 is a line drawing of an RGB basic color image used as the basic color image Z common to the system A and system B in the transmission of an image shown in FIGS. 1 and 2.
Figure 6:
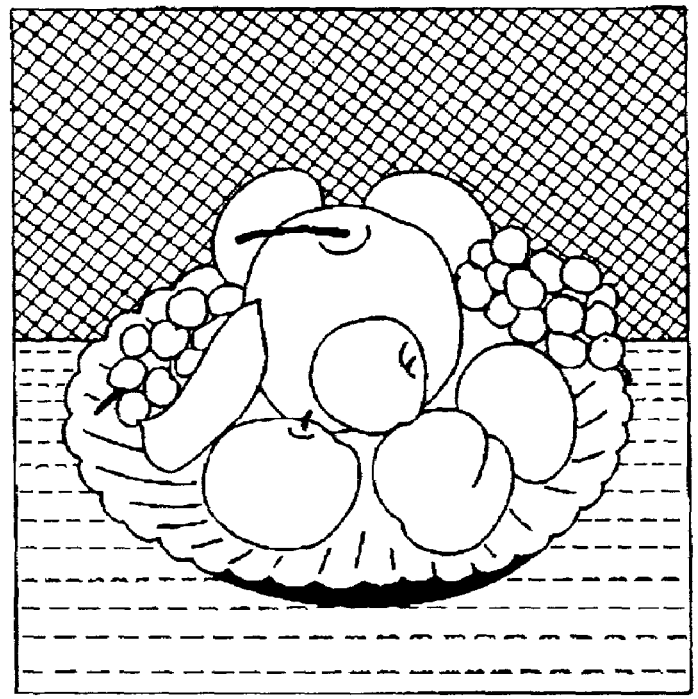
FIG. 6 is a line drawing showing the content of a photographic print of fruit employed in the experiment of the first embodiment.

First, a known RGB basic color image (FIG. 3) was selected as a color image Z common to the systems A and B, while a photograph (print) of fruit shown in FIG. 6 was employed as the original image desired to be transmitted.

First, at step 1 of the preparatory work, the basic color image Z was scanned by the scanner 4 of the system A and stored as digital data in the memory of the computer 1. The digital data was written onto an MO disc by the MO drive 5. At step 2, the digital data on the MO disc was read into the memory of the computer 6 of the system B from the MO drive 10 of the system B and displayed as the digital image $Z_1$ on the monitor 7.

Next, at step 3, the computer 6 was operated to adjust the color data indicated on the monitor [brightness, contrast, chroma and color balance (R.G.B.)] so that the color of the digital image $Z_1$ substantially matched the basic color image Z when viewed by applying a conventional method such as a method described in "User's guide of Adobe® Photoshop LE-J (Japanese Edition: Chapter 8: Correction Color, page 101–110)". The deviation from the original (zero point) of the color data produced in this work was read and set as the correction values C for application to the color matching operation applied to any digital image indicated on the monitor of the system B, which was transmitted from the system A, so that a digital image having substantially identical color to any original image of the system A can be indicated on the monitor of the system B, then the preparatory work is ended. Note that the correction values were brightness (−54), contrast (−9), chroma (0), and color balance [R(−8), G(03), B(−6)]

Next, at step 4 of this experiment, the photographic print X of fruit shown in FIG. 6 was scanned by the scanner 2 of the system A and stored in the memory of the computer. This data was written onto an MO disc by the MO drive 5. At step 5, this MO disc was transferred to the system B and the data (*) displayed as the digital image $X_1$ on the monitor 7. Next, the color matching operation was applied to the digital image $X_1$ to create the condition that the color of the digital image $X_1$ was corrected to substantially match the color of the original image X by applying the above-mentioned correction values to the color data (*). As a result, it was possible to indicate on the monitor of the system B a digital image $X_z$ of a color substantially matching the original image X when viewed.

From the understanding that the basic technical idea of the present invention relating to the transmission of images between a pair of systems A and B is valid between image processors even in the same system, the following experiment was performed as a second embodiment.

That is, this experiment was conducted to confirm whether or not the basic technical idea of the present invention can be applied to change color of the digital image indicated on the monitor of the system in a condition to substantially match the color of the original image before scanning. This experiment was performed at the system A using a photographic print of fruit (FIG. 6) employed in the experiment of the first embodiment and employing the above RGB basic color image Z (FIG. 3) to find the correction values applied to the color matching operation.

Figure 4:
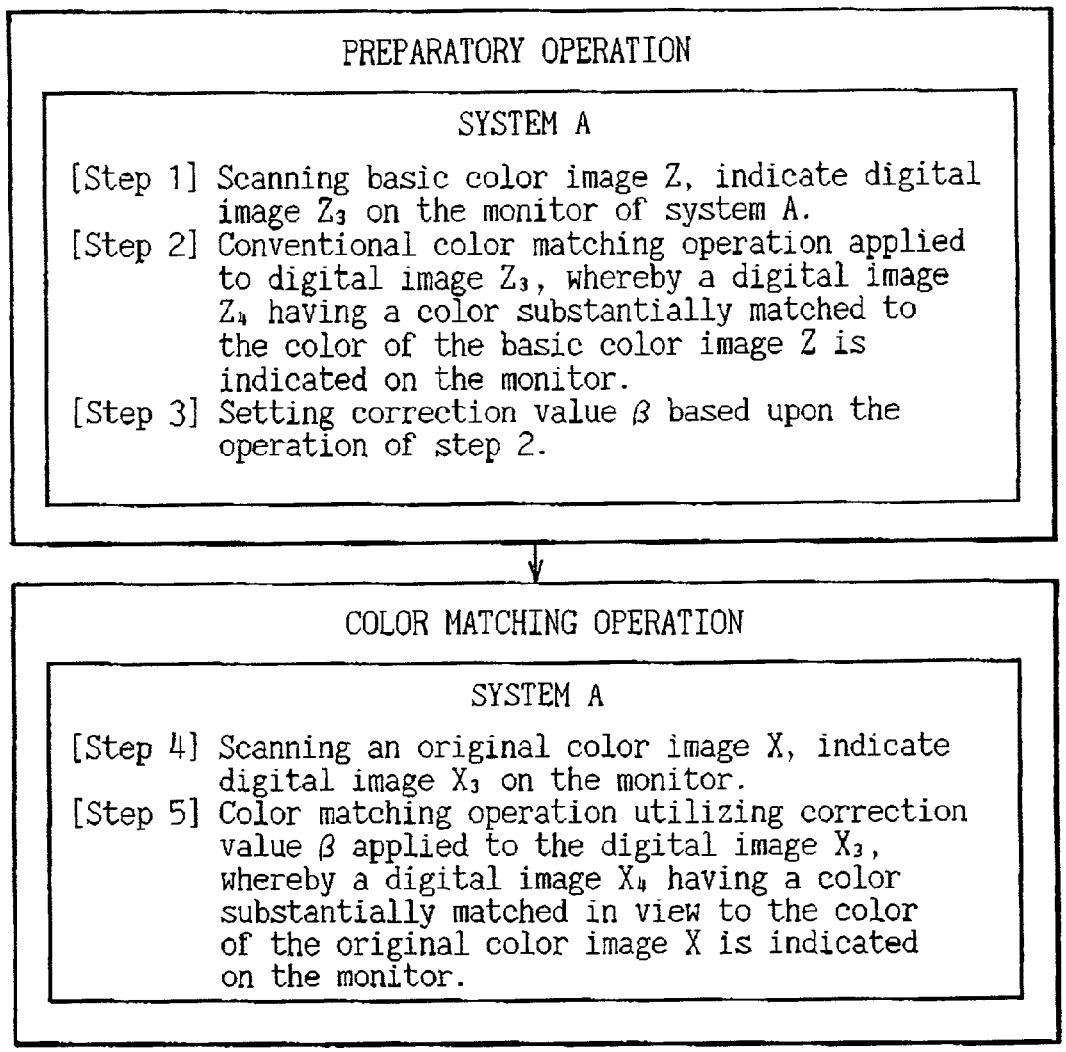
FIG. 4 is a flow chart of the content of the process of a second embodiment.

The results of the experiment of the second embodiment are explained below with reference to the flow chart shown in FIG. 4.

First, at step 1, a reference color image z was scanned by the scanner A and stored as digital data in the memory of the computer 1. This was displayed on the monitor 2 as the digital image $Z_3$. Next, the color data displayed on the monitor 2 [brightness, contrast, chroma, and color balance (R, G, B)] of the digital image $Z_3$ was adjusted by conventional technique of adjustment by operating the computer 1 so as to make the color of the digital image $Z_3$ substantially match the color of the basic color image Z when viewed. The resultant digital image $Z_4$ was displayed on the monitor (step 2). Next, at step 3, the deviations from the origin (zero point) of the color data were read and set as the correction values $\beta$ to be applied in the image color correction, then the preparatory work was ended. Note that the values were brightness (−39), contrast (−3), chroma (0), and color balance [R(+1), G(0), B(+1)].

Next, the color matching operation of an image was performed by the main work. That is, at step 4, a photographic print (FIG. 6) of the original image X was scanned by the scanner 4 and its digital data stored in the memory of the computer 1. At step 5, the data was displayed as the digital image $X_3$ on the monitor 2. Next, the above correction values $\beta$ were applied to color match the digital image $X_3$ for the known image color correction work. As a result, it was possible to display on the monitor a digital image $X_4$ of a color substantially matching the original image X when viewed.

The results of the experiment showed that when repeatedly scanning independent original images by a scanner in the same system and displaying them on the monitor of the computer, it was possible to easily and efficiently perform the work for displaying digital images of a color substantially matching the original images when viewed. Even when extremely accurate color matching is required, the results showed that the object can be achieved extremely efficiently and easily by the above-mentioned image color matching operation on the digital image displayed on the monitor by the technique of the present invention and by finishing work for enhancing the quality of color matching by known techniques. The extremely high practical value of the present invention can be understood from these results.

Figure 5:
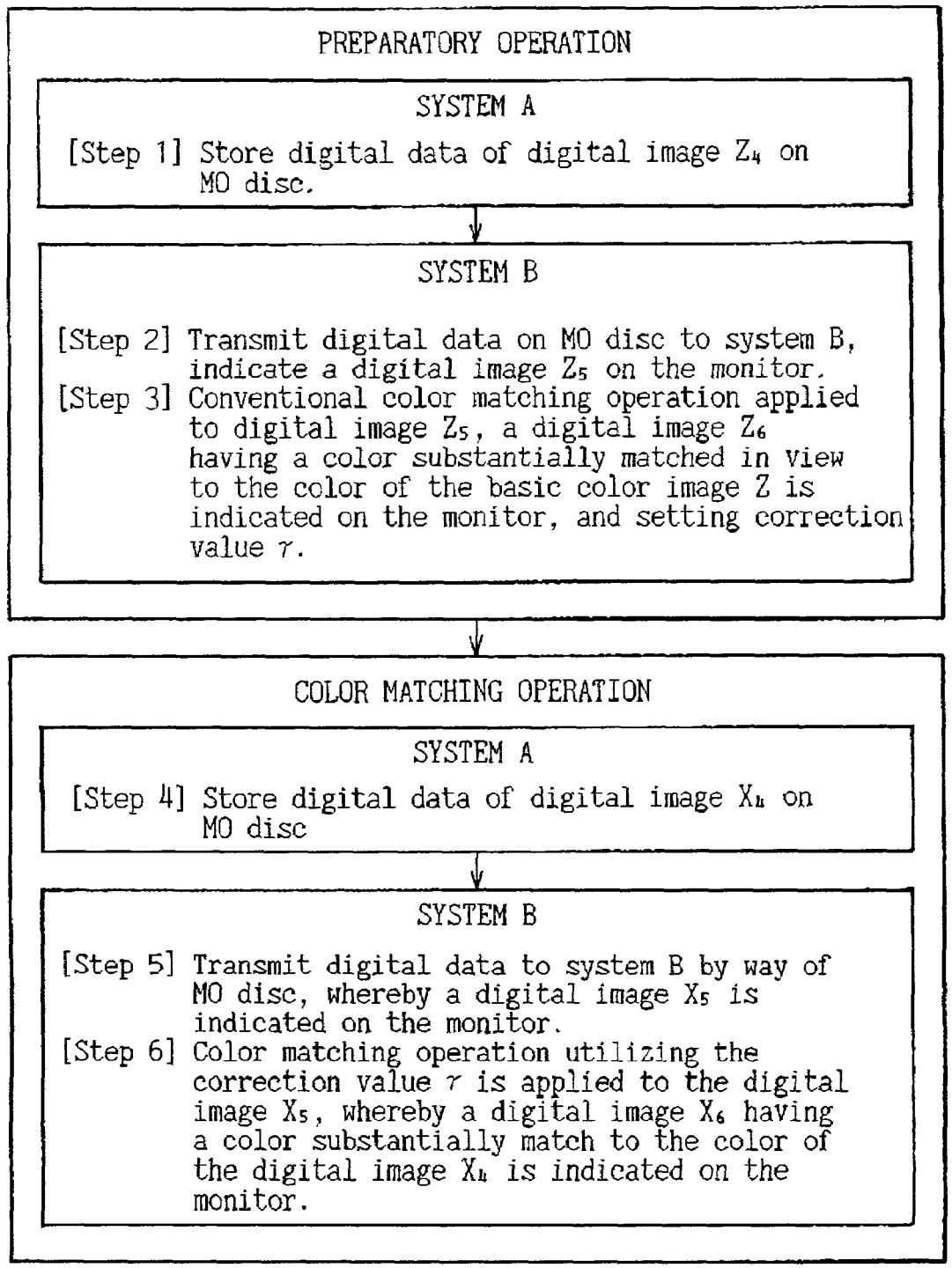
FIG. 5 is a flow chart of the content of the process of a third embodiment.

The next embodiment is an experiment conducted for the case of transmitting an image from the system A to the system B comprising displaying a digital image $X_4$ (second embodiment) substantially matching in image color with the original image X when viewed on the monitor 2 even at the system A, transmitting the digital data of the digital image $X_4$ to the system B through an MO disc, storing the data in the memory of the computer 6 of the system B, displaying it as the digital image $X_5$ on the monitor 7, and performing image color matching operation on this digital image $X_5$ to display a digital image $X_6$ of a color substantially matching the original image X when viewed. When transmitting an image from the system A to the system B by this embodiment, it becomes possible to discuss work in a state displaying digital images of the same composition and having substantially matching image color on the monitors of the two systems. Next, an experiment performed as a third embodiment will be explained with reference to the flow chart of FIG. 5.

This experiment includes the main work of color matching of a digital image, but the work overlaps that of the second embodiment, so the explanation will be given omitting the overlapping work.

First, at step 1, digital data of the digital image $Z_4$ was stored on an MO disc at the system A. At step 2, this MO disc was transmitted to the system B, the data was stored in the memory of the computer 6 of the system B, and a digital image $Z_5$ was displayed on the monitor 7. At step 3, the conventional color matching operation of the digital image $Z_5$ displayed on the monitor 7 of the system B was performed by adjusting the color data of the monitor display to correct the color to that substantially matching the color of the original basic color image Z when viewed. The deviations from the origin (zero point) of the color data were read and set as the correction values $\gamma$ for application to the color modification operation to be performed on the digital image on the monitor 7 in the work of the same step as the digital image $Z_5$, and then the preparatory work was ended. Note that the correction values $\gamma$ were brightness (−15), contrast (−6), chroma (0), and color balance [R(−7), G(0), B(−5)].

Next, the main color matching operation applied to the case that an original image is transmitted from the system A to the system B and a digital image indicated on the monitor of the system B is changed to substantially match to the original image when viewed, is explained.

That is, at step 4, digital data of the digital image $X_4$ corresponding to the original image X was stored on an MO disc. At step 5, this MO disc was transmitted to the system B and the image was displayed as the digital image $X_5$ on the monitor 7 of the system B. Next, at step 6, the correction values $\gamma$ were applied to the color matching operation applied to the digital image $X_6$. As a result, it was possible to display on the monitor 7 a digital image $X_6$ substantially matching the original image X when viewed.

From the results of the experiments of the above first, second, and third embodiments, the fact that there is an interesting interrelationship among the correction values $\alpha$, $\beta$, and $\gamma$ was found. That is, it was learned that the following relation stands among these correction values:

$$\alpha - \beta \approx \gamma$$

This relation was confirmed by repeated experiments.

Further, according to these repeated experiments, it was confirmed that if correction values to be applied to the case of transmitting an image from the system A to the system B are selected, when transmitting an image from the system B to the system A, the same image color matching results are obtained by applying correction values the same in absolute values as these correction values but inverted in polarity (positive & negative).

As explained above, in the experiments of the embodiments, the color matching of the digital image displayed on the monitor 7 at the system B was achieved by operating the computer to adjust the color data (brightness, contrast, chroma, and color balance) displayed on the monitor based on the above color matching operation, but when regularly transmitting plural images between the systems A and B or when simultaneously transmitting and processing a large number of images, color matching operation of the image color by computer operation for each digital image as explained in the above embodiments would be still somewhat troublesome even though the technique of the present invention is superior to the conventional technique.

However, this problem is solved by preparing an "action program for image color matching" corresponding to the image processing patterns by the above-mentioned correction values and installing the action program in the corresponding computer to perform the image color matching operation. Next, an explanation will be given of an experiment in the case of use of an action program as a fourth embodiment. Note that the preparation of such an action program is already known, for example, as in the explanation of a the manual of Adobe® Photoshop 5.5J, so a detailed explanation of the preparation of the action program will be omitted. Further, this experiment is of a format executed after step 5 of the experiment of the first embodiment, so for the experiment of this embodiment, the explanation will be limited to the work after step 3.

In an experiment as a fourth embodiment, first the step 4 of the preparatory work was performed as follows: That is, first, in the system B, the digital image $Z_1$ was displayed on the monitor and in that state the above correction values α that is, the brightness (−54), contrast (−9), chroma (0), and color balance [R(−8), G(0), B(−6)], were applied to prepare an action program by a known technique. Next, this action program was installed in the computer 6 of the system B as the action program 1. After the above preparatory works the steps 4 to 5 of the experiment of the first embodiment were used to display the digital images $X_1$ for a plurality of original images differing in color on the monitor 7 of the system B, the computer 6 was operated to call up the action program 1, and the color matching operation were performed successively on the above mentioned plural digital images $X_1$. That is, the color matching operation for the color data was successively automatically executed by the action of the computer without independent color matching operations of the color data displayed on the monitor.

Further, a so-called batch processing which processes several digital images stored as digital data in a computer memory all at once is also known. Therefore, when color matching of several transmitted images is necessary, by employing this batch processing system when continuously transmitting images between the system A and the system B, it is possible to further raise the work efficiency. This fact is also confirmed by experiments conducted after the experiment of this embodiment.

The next fifth embodiment shows the results of an experiment assuming the case of utilization of the method of correction of the color of an image of the present invention to photographic work by a network system envisioned for the future. At the present time, photographic work by a so-called network system, including printing, is a known fact in Japan and overseas, but as mentioned above, the advances made in image processing technology by computer applied to digital data have resulted in huge changes in the nature of the business. The following business system may be mentioned as an example of a specific form of this.

That is, a digital image processing network comprised of organizations A having sufficient computer image processing technology and organizations B specializing in the work of a so-called relay business just receiving orders for image processing (correction, processing, etc. of images) from customers and requesting the actual work from the organizations A, is established. For example, a business system which divides Japan into several blocks, appoints one organization A in each block, and performs the business of the above system by a network comprised of organizations B present in the individual blocks may naturally be envisioned. The following experiment was performed envisioning this mode of business and assuming the system B as an organization A and the system A as an organization B.

Figure 7:
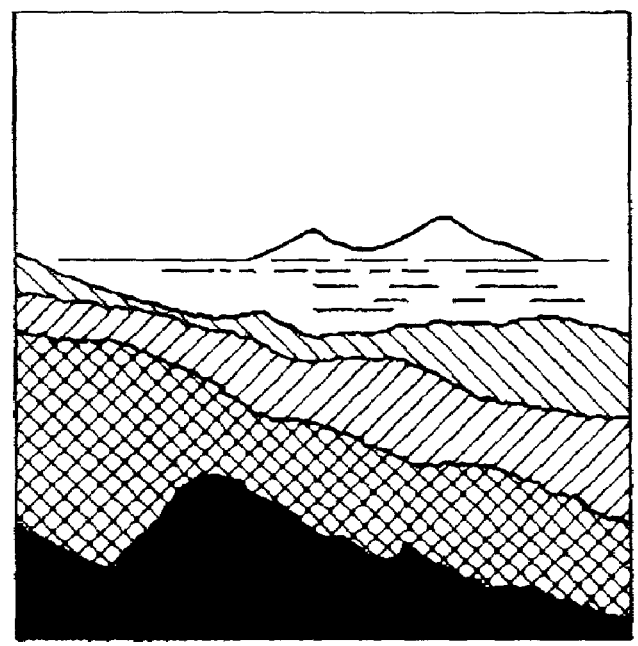
FIG. 7 is a line drawing showing the content of a photographic print of Mt. Bandai employed in the experiment of a fifth embodiment.

In the experiment of the fifth embodiment, specifically, in the same way as in the above first to fourth embodiments, the case was envisioned where an RGB basic color image Z was selected as the basic color image common to the network, preparation of an enlarged photograph based on a photographic print X of Mt. Bandai (original image, FIG. 7) brought by the customer was ordered at the system A, predetermined work was performed by the system B, and the final photograph product was delivered to the customer through the system A.

Figure 8:
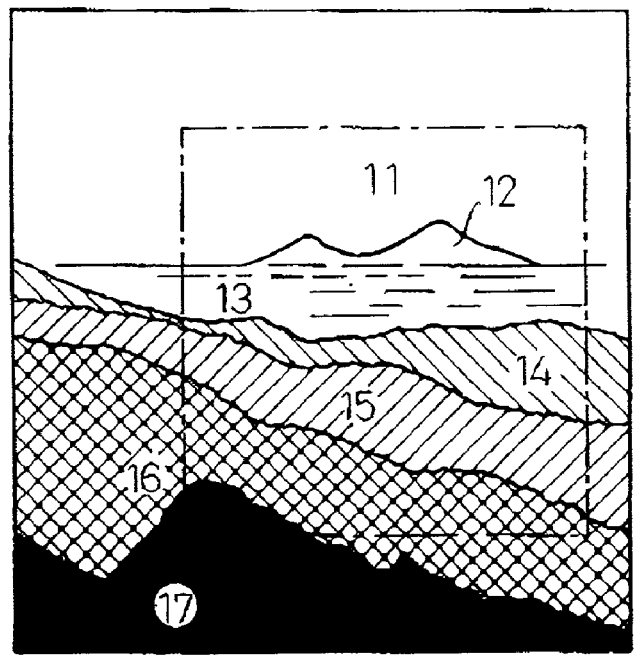
FIG. 8 is a line drawing showing part of a specification (trimmed display) used in the experiment of the fifth embodiment.
Figure 9:
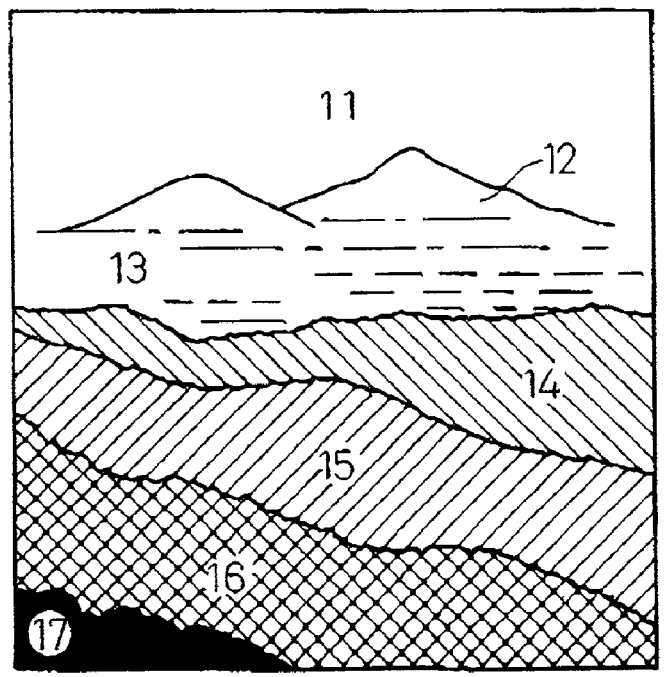
FIG. 9 is a line drawing showing part of a specification (color balance display of image) used in the experiment of the fifth embodiment.

Explaining this more specifically, in this experiment, the customer designated as content of processing for preparation of an enlarged photograph of an original image X as an original image the trimming (FIG. 8), color balance of the elements of the composition (FIG. 9) [Note: Color balance between sky (11), top of Mt. Bandai (12), sea of clouds (13), mountains (14, 15, 16 and 17)], and the dimensions of the final product, so at the system A, a specification S was prepared based on the designations. The original photographic image X and specification S were then scanned by the scanner of system A and stored as digital data in the computer 1, and the data was stored on an MO disc and transmitted to the system B.

At the system B, the data was stored in the computer 6 from the MO disc, the digital image $X_1$ indicated on the monitor 7, and predetermined image processing was performed on the digital image $X_1$ (similarly to the digital image $S_1$ displayed on the monitor), a digital image $X_7$ corresponding to the specification was thereby indicated on the monitor, and the image color of the digital image $X_7$ was adjusted in advance to the above-mentioned reverse transmission procedure so that color adjusted digital image $X_8$ was displayed on the monitor of the system B.

Then the digital image $X_8$ was transmitted back to the system A (by MO disc) so as thereby to display a digital image $X_9$ matching in composition with the digital image $X_7$ and substantially matched in image color to that of the digital image $X_7$ on the monitor of the system A.

The following modification for setting the correction value becomes clear from the fifth embodiment of the present invention, that is, once the correction value δ is set in the color matching operation applied to correct the color of the digital image indicated on the monitor of the system B when the original color image is transmitted from the system A to the system B, the correction value (−δ) can be effectively applied to the color matching operation to correct the color of the digital image indicated on the monitor of the system A to match to the color of corresponding digital image indicated on the monitor of the system B in the case of transmitting the digital image indicated on the monitor of the system B to the system A.

In this experiment as well, an RGB reference color image was used as the reference color image, so the correction values α of the first embodiment were employed as they were as the correction values applied to the color matching of a digital image performed in the system B. Therefore, in this experiment, first, the above specification S was prepared as preparatory work. Next, as a first step, a photographic print X of Mt. Bandai and specification S were scanned by a scanner of the system A and stored in the memory of the computer 1 as digital data, an MO disc in which this data was stored was prepared and transmitted to the system B, and the digital images $X_1$ and $S_1$ were displayed on the monitor 7.

Next, image color matching was performed on the digital image $X_1$ and digital image $S_1$ applying the above-mentioned correction values α, that is, the brightness (−54), contrast (−9), chroma (−9), and color balance [R(−8), G(0), B(−6)] to as to display the digital image $X_2$ and digital specification $S_2$ of the same compositions as the original image X and specification S and substantially matched in color on the monitor 7. Further, the digital image $X_5$ of the content specified by the customer was displayed on the monitor 7 of the system B based on the image $X_2$ with reference to the digital specification $S_2$.

Next, a digital image of the same composition as the digital image $X_5$ and substantially matching in color was displayed on the monitor 2 of the system A. When transmitting this digital image from the system B to the system A, it is only natural that a change in the image color is unavoidable, so preparatory work based on the technical idea of the present invention becomes necessary. Image color matching operation employing values δ obtained by inverting the signs of the correction values γ=(α−β) obtained from the correction values α and β obtained by the experiments of the first and third embodiments, that is, the brightness (+15), contrast (+5), chroma (0), color balance [R(+7), G(0), B(+5)], was performed on the digital image $X_5$ to indicate the corrected digital image $X_8$ on the monitor 7. Next, the digital data of the digital image $X_8$ was transmitted by an MO disc to the system A. As a result, it was possible to display a digital image $X_9$ of the same composition as the digital image $X_5$ and substantially matched in color on the monitor 2 of the system A.

As a result, it is possible for the system A to prepare an enlarged print image based on the digital data $X_9$ by a known method by its own printer. Further, it is also naturally possible for the system B to perform print work in accordance with the specifications of a customer based on the digital image $X_5$ and transmit the product to the system A.

The systems A and B performing the experiments in the above embodiment are both provided with scanners for reading images, and use the scanners to read original images and store them as digital data in the computer memories, but the digital data of images taken by a digital camera can be stored in the computer memories by known methods, so the method for calibrating color of a transmitted digital image between two systems according to the present invention can be successfully applied to the transmission of a color image taken by any digital camera.

In the above-mentioned five embodiments, each embodiment sets its own correction value to apply the color matching operation in accordance with how the digital image is transmitted between the systems A and B. Therefore, it is clear that the correction value applied to the color matching operation must depend upon the mode of transmission of the digital image between these systems A and B.

The following is clear from experiments in the above embodiments. That is, regardless of the selection of the basic color image, it is impossible to avoid error accompanying the setting of correction values used for image color matching operation because of the effect of the environment of the location of installation of the facilities performing the work, for example, the lighting, in terms of a visual comparison with the image color, and since there are errors in reading by the observer. This had a detrimental effect on the results of the image matching operation according to the present invention. However, as a result of repeated experiments, it was learned that a substantial effect can be expected by taking the following steps. That is, it is possible to perform the operation of setting the correction values by several operations in the same environment and finding the averages of the results or, in the case of a single operator, to set the values by the average values of data obtained by repeated experiments (experiments conducted independently) so as to eliminate the effects of error as much as possible.

EFFECTS OF THE INVENTION

As explained above, the problem of the mismatch of image color, which cannot be avoided when transmitting an image between two systems A and B, can be solved by applying correction values set in the two systems using a common basic color image as a medium. Image color can accordingly be corrected with a much higher efficiency and practicality compared with the conventional technique. Therefore, the method of calibrating of image color in transmission of an image according to the present invention can be expected to contribute greatly to businesses using network systems directly involving the transmission of images, when the same business organization engages in work combining a plurality of independent image processing systems, and to businesses involving commercial transactions which advertise through the Internet.

The invention claimed is:

1. In a color image transmission system between a pair of computer image processing Systems A and B, a method for calibrating color of a digital image in image transmission whereby color of a digital image indicated on a monitor of either one of said systems A & B is corrected to a color being substantially matched to color of an original color image which is transmitted from the other one of said systems A & B, comprising:

after preparation of a basic color image Z being common to said systems A & B, a preparatory operation of setting a correction value which is applied to said operation of calibrating color of said digital image indicated on said monitor, by using said common basic color image, and a color matching operation applied to any digital image indicated on said monitor of either one of said systems A & B by applying said correction value in a condition of confirming the transmission pattern, whereby color of said digital image is corrected to a condition that said color of the corrected digital image is substantially matched in view to color of said original color image before transmission.

2. A method for calibrating color of a digital image in transmission between a pair of computer image processing systems A & B according to claim 1, wherein said transmission of a digital image is carried out from said system A to said system B, said preparatory operation to set correction value α comprising:

a first step of scanning said basic color image Z by a scanner of said system A so that a digital image of said basic color Z is indicated on a monitor of said system A, a second step of transmitting digital data of said digital image to said system B by way of an MO disc so that a digital image $Z_1$ is indicated on the monitor of the system B, and a third step of carrying out a color matching operation of the digital image $Z_1$ out by conventional method so that a color modified digital image $Z_2$ having a color substantially matched to the color of the common basic color image Z is indicated on the monitor of the system B, then setting said correction value α based upon the color data deviated from initial color data indicated on said monitor before applying said color matching operation, said color matching operation comprising:

a fourth step of scanning an original color image X whereby digital data of said original color image X is stored in a computer of said system A, a fifth step of transmitting said digital data from said system A to said system B by way of an MO disc whereby a digital image $X_1$ is indicated on the monitor of said system B, and a sixth step of applying a color matching operation to said digital image $X_1$ by applying said correction value whereby a color modified digital image $X_2$, having color substantially matched in view to the color of said original color image X is indicated on the monitor of said system B.

3. A method for calibrating color of a digital image in transmission between a pair of computer image processing systems A & B according to claim 1, wherein said transmission of a digital image is carried out from said system A to said system B, a color matching operation to indicate a digital image having a color substantially matching the color of an original color image being carried out before said transmission, said color matching operation comprising:

a preparatory operation to set a correction value β which is applied to said color matching operation by using said common basic color image Z, said preparatory operation comprising:

a first step of scanning said basic color image Z by the scanner of said system A whereby a digital image $Z_3$ is indicated on the monitor of said system A, a second step of applying a conventional color matching operation to correct the color of said digital image $Z_3$ whereby a color modified digital image $Z_4$ having a color matched to the color of the basic color image Z is indicated on the monitor of said system A, and a third step of setting a correction value β based upon color data deviated from initial color data indicated on said monitor before applying said color matching operation, whereby in color matching operation, a digital image $X_4$ having a color substantially match in view to the color of an original color image X is created from a digital image $X_3$ indicated on the monitor of the system A by applying said correction value β to said color matching operation.

4. A method for calibrating color of a digital image in transmission between a pair of computer image processing systems A & B according to claim 3, wherein said preparatory operation to set correction value γ comprises:

a first step of storing digital data of said digital image $Z_4$ on an MO disc, a second step of transmitting said digital data of said digital image $Z_4$ to said system B by way of said MO disc so that a digital image $Z_5$ is indicated on the monitor of said system B, and a third step of applying a conventional color matching operation to said digital image $Z_5$ whereby a color modified digital image $Z_6$ is indicated on the monitor of said system B, said correction value γ then being set based upon color data deviated from initial color data indicated on the monitor of said system B before applying said color matching operation, said color matching operation applied to a digital image $X_5$ indicated on the monitor of said system B by transmitting said digital image $X_4$ indicated on the monitor of said system A being carried out by applying said correction value γ whereby a digital image $X_6$ having a color substantially matched to the color of the digital image $X_4$ indicated on the monitor of said system A is indicated on the monitor of said system B.

5. A method for calibrating color of a digital image in transmission between said systems A & B according to claim 2 or claim 4, further comprising successive operations consisting of changing a composition of said digital image $X_2$ displayed on the monitor of said system B so that a new digital image $X_7$ is indicated on the monitor of said system B, a preparatory operation carried out before transmitting said digital image $X_7$ to said system A, and transmission of a digital image created by said preparatory operation, wherein in said operation of changing the composition of said digital image $X_2$ displayed on the monitor of said system B so that a new digital image $X_7$ is indicated on the monitor of said system B, and said preparatory operation before transmitting said digital image $X_7$ to said system A, color modification by a correction value $(-\gamma)$ is applied to said digital image $X_7$ so that a modified digital image $X_8$ is indicated on the monitor of said system B, and digital data of said digital image $X_8$ is transmitted by MO disc from said system B to said system A whereby a digital image $X_9$ having a color substantially matched in view to color of said digital image $X_8$ is indicated on said monitor of system A.

6. A method for calibrating color of a digital image transmission between said systems A & B according to claim 1, further comprising an operation of setting an action program based upon said correction value for automatically and successively carrying out color matching operations on said digital image being a target of color matching operations, and installing said action program in said computers of said systems A & B, whereby said color matching operations of a digital image applied to a plurality of independent color images are successively carried out by said action program.

7. A method for calibrating color of a digital image transmitted between said systems A & B according to claim 1, wherein said basic color image Z is a R.G.B. basic color image.

8. A method for calibrating color of a digital image transmitted between said systems A & B according to claim 1, wherein correction value δ is once set in a case of transmission from said system A to said system B, and a correction value $(-\delta)$ is used as the correction value for carrying out the color matching operation applied to transmit a digital image from said system system B to said system A.

* * * * *